(12) United States Patent
Ishikawa et al.

(10) Patent No.: US 6,366,005 B2
(45) Date of Patent: Apr. 2, 2002

(54) TUNING FORK TYPE VIBRATION GYRO

(75) Inventors: Hiroshi Ishikawa; Masanori Yachi; Yoshio Satoh, all of Kawasaki; Kazutsugu Kikuchi; Yoshitaka Takahashi, both of Suzaka, all of (JP)

(73) Assignees: Fujitsu Limited, Kawasaki; Fujitsu Media Devices Limited, Suzaka, both of (JP)

( * ) Notice: Subject to any disclaimer, the term of this patent is extended or adjusted under 35 U.S.C. 154(b) by 0 days.

(21) Appl. No.: 09/747,798

(22) Filed: Dec. 22, 2000

Related U.S. Application Data

(63) Continuation of application No. PCT/JP99/02389, filed on Jun. 26, 1998.

(30) Foreign Application Priority Data

Jun. 26, 1998 (JP) .......................................... 10-181236

(51) Int. Cl.$^7$ .............................................. G01C 19/56
(52) U.S. Cl. ..................................................... 310/349
(58) Field of Search ........................ 310/370; 311/349; G01C 19/56

(56) References Cited

U.S. PATENT DOCUMENTS

| | | | | |
|---|---|---|---|---|
| 3,697,766 A | * | 10/1972 | Ganter | 310/370 |
| 3,795,831 A | * | 3/1974 | Fujita | 310/370 |
| 4,328,442 A | * | 5/1982 | Tanaka | 310/326 |
| 6,194,817 B1 | * | 2/2001 | Yachi | 310/370 |

FOREIGN PATENT DOCUMENTS

| | | | |
|---|---|---|---|
| JP | 61-93907 | 5/1986 | |
| JP | 62-188908 | 8/1987 | |
| JP | 4-203927 | 7/1992 | |
| JP | 4-372814 | 12/1992 | |
| JP | 5-18755 | 1/1993 | |
| JP | 07139951 A | * 2/1995 | ........... G01C/19/56 |
| JP | 7-139951 | 6/1995 | |
| JP | 7-243857 | 9/1995 | |
| JP | 8-114457 | 5/1996 | |
| JP | 8-128830 | 5/1996 | |
| JP | 9-269228 | 10/1997 | |

* cited by examiner

Primary Examiner—Nestor Ramirez
Assistant Examiner—Karen B Addison
(74) Attorney, Agent, or Firm—Greer, Burns & Crain, Ltd.

(57) ABSTRACT

A tuning fork type vibrator including two arms and a base is supported by a supporting substrate mounted on a stem, and an oscillation limiting member formed from a ring-shaped rubber-like elastic body is mounted with its one face secured to the stem so as to surround the base. When an external vibration or impact is applied, the tuning fork type vibrator oscillates in response to the vibration or impact, but the oscillation range of the tuning fork type vibrator is limited by the presence of this oscillation limiting member, and thus bumping of the tuning fork type vibrator against the surrounding members such as the stem is prevented. Moreover, a gyro characteristic is not impaired, and a loss of the gyro function due to a stop of drive vibration does not occur.

11 Claims, 22 Drawing Sheets

Fy MODE
VIBRATION

Fx MODE
VIBRATION

VIBRATION IN X DIRECTION

VIBRATION IN Y DIRECTION

VIBRATION IN X DIRECTION

VIBRATION IN Y DIRECTION

VIBRATION IN X DIRECTION

VIBRATION IN Y DIRECTION

FIG. 14

| PRESENCE/ABSENCE AND HARDNESS OF OSCILLATION LIMITING MEMBER (JIS A) | ABSENCE | 24 | 36 | 52 | 93 | 102 |
|---|---|---|---|---|---|---|
| RESULT | × | ○ | ○ | ○ | ○ | × |

○: NO BREAKING OF ARM
×: BREAKING OF ARM

——·—— : |Δf|=40Hz

-------- : |Δf|=80Hz

———— : |Δf|=120Hz

ANGULAR VELOCITY FREQUENCY
CHARACTERISTIC OF TUNING
FORK TYPE VIBRATOR

Fmax |Δf|

+

FREQUENCY
CHARACTERISTIC OF LPF

Fc

FREQUENCY RESPONSE
CHARACTERISTIC OF
TUNING FORK TYPE
VIBRATION GYRO

SYNTHESIS ⇨

Fmax |Δf|
Fc

TUNING FORK TYPE VIBRATION GYRO

This application is a continuation of PCT/JP99/02389, which was filed on Jun. 26, 1998, and which has not been published in English.

TECHNICAL FIELD

The present invention relates to a gyro used for detecting the rotation angular velocity, more particularly, to a tuning fork type vibration gyro having two arms and a base formed in one-piece.

BACKGROUND ART

Gyroscopes have been used as means for identifying the position of moving objects such as airplane, large vessels, space satellites, and the like. Recently, they have been utilized for detecting vibration of apparatus such as a car navigation system and video camera. Among such gyroscopes, research and development of a tuning fork type vibration gyro having a constitution comprising two arms and a base for supporting the two arms, which are formed in one-piece by a piezoelectric monocrystal, have been pursued.

FIG. 1 is, for example, a structural view of a tuning fork type vibration gyro disclosed in Japanese Patent Application Laid-Open (Tokukaihei) No. 9-269228(1997). In FIG. 1, numeral 1 denotes a tuning fork type vibrator. The tuning form type vibrator 1 has two arms 2, 3 and a base 4 for supporting the arms 2 and 3. The arms 2, 3 and base 4 are formed in one-piece by processing a piezoelectric monocrystal such as LiTaO$_3$, LiNbO$_3$, etc. By coupling the base 4 of this tuning fork type vibrator 1 to a supporting substrate 6 mounted on a stem 5, the tuning fork type vibrator 1 is supported.

Moreover, a horizontal section of a supporting arm 7 having a substantially U-shaped cross section is inserted into a slit of the supporting substrate 6 formed to include the center of rotational motion of the supporting substrate 6, and attached flexibly to the supporting substrate 6 through an adhesive layer 8 formed of a rubber-like elastic body. Both of the end sections of the supporting arm 7 are provided with a protrusion, and these protrusions are inserted into holes formed in the stem 5.

Furthermore, in order to cover and protect these members, a cap 9 is provided. The cap 9 and the stem 5 form a case 10. Besides, a circuit substrate 11 (see FIG. 5) including a later-described drive circuit for exciting drive vibration and a detection circuit for processing a detection signal may be provided on the stem 5 and/or the cap 9 so as to be housed in the case 10.

As shown in FIGS. 2(a) and 2(b), such a tuning fork type vibrator 1 includes fx mode vibration (in-plane vibration) and fy mode vibration (plane-vertical vibration). When drive vibration (in-plane vibration) is exited, if a rotational angular velocity is applied, detection vibration (plane-vertical vibration) occurs, and then an output signal proportional to the magnitude of this vibration is detected so as to find the angular velocity.

By the way, denoting a drive vibration (in-plane vibration) direction, a detection vibration (plane-vertical) vibration direction and a rotation axis direction perpendicular to both of these directions as the X direction, Y direction and Z direction, respectively, when external vibration or impact is applied to the X direction and Y direction particularly, the tuning fork type vibrator 1 produces oscillating motion as shown in FIGS. 3(a) and 3(b) together with the supporting substrate 6.

In this case, as shown in FIGS. 4(a) and 4(b), the tip of the tuning fork type vibrator 1 (arms 2 and 3) bumps first against the inner wall of the case 10, that is, the stem 5 or the cap 9. Besides, if the circuit substrate 11 is mounted on the inner wall of the case 10, as shown in FIGS. 5(a) and 5(b), the tip of the tuning fork type vibrator 1 (arms 2 and 3) bumps first against the circuit substrate 11. Here, if external vibration or impact is great, the tuning fork type vibrator 1 is destroyed as it is broken at the joint section of the arms 2 and 3 by this impact, causing a problem that the tuning fork type vibrator 1 can not perform the function of a sensor.

Various ideas for protecting the tuning fork type vibrator from external vibration or impact have been proposed (Japanese Patent Application Laid-Open (Tokukaihei) No. 5-18755(1993) (prior art 1) and No. 7-243857(1995) (prior art 2)).

In the prior art 1, a cushioning member and a protecting member are illustrated. This cushioning member is provided between a cover to which a supporting member for supporting the tuning fork type vibrator is secured and a case surrounding the cover, and has the function of absorbing external vibration. Moreover, the protecting member provided in the vicinity of the outside of both of the ends of the supporting member of the tuning fork type vibrator has the function of preventing an excessive displacement of the tuning fork type vibrator, i.e., a large plastic deformation of the supporting member.

However, in this prior art 1, if vibration with a very high accelerating rate is applied, the cushioning member can not absorb this vibration. Consequently, the supporting member has a plastic deformation, and the center axis of the tuning fork type vibrator is displaced from the initial set position, resulting in significant deterioration of gyro characteristics. In addition, there is a possibility that the plastic deformation of the supporting member is further increased by impact, etc. and the tuning fork type vibrator remains contact with the surrounding members. In such a case, since the drive vibration is stopped, the tuning fork type vibrator can not perform the function of a gyro sensor at all.

Meanwhile, the prior art 2 discloses a structure which solves the problem associated with the prior art 1 and is effective to resist external impact. A cushioning member for absorbing external impact is provided between a work plate and a plate to which a supporting member for supporting a tuning fork type vibrator is attached; between a circuit substrate to which the work plate is attached and a case; and between the work cover attached to the work plate and a case. In the structure of this prior art 2, a cushioning member is provided between respective adjacent members among the outermost case, the circuit substrate housed in the case, a shield cover of the circuit substrate, the work cover, the work plate and the tuning fork type vibrator so as to successively absorb external impact by the respective cushioning members.

However, in this prior art 2, since a large number of the cushioning members are provided, there is a problem that the overall structure is not made compact. Moreover, in the event where the tuning fork type vibrator remains contact with the surrounding members, it can not perform the function of a gyro sensor at all like the prior art 1.

Incidentally, in a tuning fork type vibration gyro having a basic structure as shown in FIG. 1, when the center axis of rotation of the tuning fork type vibrator 1 and the supporting axis of the supporting arm 7 are perfectly aligned with each other, for example, even if external vibration in the Y direction is applied, the tuning fork type vibrator 1 produces only translation vibration as shown in FIG. 6 because the upper and lower moments with respect to the line of the supporting axis as the boundary are equal. However, it is difficult to align these axes with each other, and if external vibration in the Y direction is applied when these axes are not aligned with each other, the upper and lower moments with respect to the line of the supporting axis as the boundary are unbalanced, and a rotational motion is produced as shown in FIG. 7. Thus, there is a problem that, even when a rotational motion is not applied to the tuning fork type vibrator 1, an unnecessary rotational motion signal is detected.

The principal object of the present invention is to provide a tuning fork type vibration gyro capable of preventing destruction of a tuning fork type vibrator due to external vibration or impact with a compact structure.

Another object of the present invention is to provide a tuning fork type vibration gyro capable of decreasing an unnecessary signal, which is produced when external vibration is applied.

SUMMARY OF THE INVENTION

A tuning fork type vibration gyro of a first aspect, which is a tuning fork type vibration gyro comprising a tuning fork type vibrator including two arms and a base and a supporting substrate for supporting the base, is characterized by comprising an oscillation limiting member disposed at a position in a direction to the base from a joint section of the arms, for limiting an amplitude of oscillation of the tuning fork type vibrator.

In the tuning fork type vibration gyro of the first aspect, the oscillation limiting member for limiting the amplitude of oscillation of the tuning fork type vibrator caused by external vibration or impact is provided at an arbitrary position to the base from the joint section of the arms of the tuning fork type vibrator (the boundary section between the arms and base) where in-plane vibration does not occur. Hence, this oscillation limiting member prevents the tuning fork type vibrator from bumping against the surrounding members, and thereby preventing destruction of the tuning fork type vibrator.

A tuning fork type vibration gyro of a second aspect, which accords with the first invention, is characterized by further comprising an adhesive layer between the tuning fork type vibrator and the supporting substrate for bonding the tuning fork type vibrator and supporting substrate together and characterized in that the oscillation limiting member is secured to either the tuning fork type vibrator, the supporting substrate or the adhesive layer.

In the tuning fork type vibration gyro of the second aspect, the oscillation limiting member is provided on at least one of the tuning fork type vibrator, supporting substrate and adhesive layer, and it is possible to readily dispose the oscillation limiting member.

A tuning fork type vibration gyro of a third aspect, which accords with the first invention, is characterized by further comprising a case for housing the tuning fork type vibrator and supporting substrate, and characterized in that the oscillation limiting member is disposed between the tuning fork type vibrator and the case.

A tuning fork type vibration gyro of a fourth aspect, which accords with the first aspect, is characterized by further comprising a circuit substrate connected with the tuning fork type vibrator, and characterized in that the oscillation limiting member is secured to the circuit substrate.

In the tuning fork type vibration gyro of the third or fourth aspect, the oscillation limiting member is disposed between the tuning fork type vibrator and the case or between the tuning fork type vibrator and the circuit substrate, and this oscillation limiting member prevents the tuning fork type vibrator from bumping against the circuit substrate or the case.

A tuning fork type vibration gyro of a fifth or sixth aspect, which accords with the third or fourth invention, is characterized in that a clearance between the arm and the case or a clearance between the arm and the circuit substrate is not smaller than a predetermined value.

In the tuning fork type vibration gyro of the fifth or sixth aspect, since the position and shape of the oscillation limiting member are arranged so that the clearance between the tuning fork type vibrator and the case or the clearance between the tuning fork type vibrator and the circuit substrate is not smaller than the predetermined value, the tuning fork type vibrator can never bump against the case or the circuit substrate.

A tuning fork type vibration gyro of a seventh or eighth aspect, which accords with the fifth or sixth aspect, is characterized by simultaneously satisfying equations $H = L \times \sin\theta > 0$, and $\tan\theta = (H - H')/L'$ where H is a distance between the tuning fork type vibrator and the case or the circuit substrate, L is a distance between a center of oscillation of the tuning fork type vibrator and supporting substrate and a tip of the tuning fork type vibrator, H' is a distance between the case or the circuit substrate and a position at which the tuning fork type vibrator or the supporting substrate comes into contact with the oscillation limiting member when the tuning fork type vibrator oscillates, and L' is a distance between a center of oscillation of the tuning fork type vibrator and supporting substrate and a position at which the tuning fork type vibrator or the supporting substrate comes into contract with the oscillation limiting member when the tuning fork type vibrator oscillates.

In the tuning fork type vibration gyro of the seventh or eighth aspect, the position and shape of the oscillation limiting member are arranged so as to satisfy the above equations, and thus the tuning fork type vibrator does not bump against the case or the circuit substrate.

A tuning fork type vibration gyro of a ninth aspect, which accords with the first aspect, is characterized in that the oscillation limiting member is formed from a material selected from the group consisting of elastic bodies of epoxy resins, urethane resins, silicone rubbers and butyl rubbers, and foam materials thereof In the tuning fork type vibration gyro of the ninth aspect, a material as those mentioned above is used for the oscillation limiting member, and thus it is possible to readily mass-produce the oscillation limiting member even if it has a complicated shape.

A tuning fork type vibration gyro of a tenth aspect, which accords with the ninth aspect, is characterized in that a hardness of the oscillation limiting member is not more than 100 (JIS A).

In the tuning fork type vibration gyro of the tenth aspect, the hardness of the oscillation limiting member is arranged not to exceed the above-mentioned numerical value, thereby preventing the tuning fork type vibrator from being broken.

A tuning fork type vibration gyro of an eleventh aspect, which is a tuning fork type vibration gyro comprising a tuning fork type vibrator including two arms and a base, and a supporting substrate for supporting the base, for performing in-plane vibration of the tuning fork type vibrator as drive vibration and twisted vibration of the tuning fork type vibrator and supporting substrate as one body as detection vibration, is characterized in that an absolute value of a difference between a resonant frequency of the drive vibration and a resonant frequency of the detection vibration is not smaller than an upper limit of a required frequency characteristic.

In the tuning fork type vibration gyro of the eleventh aspect, the absolute value of the difference between the resonant frequency of drive vibration and the resonant frequency of detection vibration is arranged not to be smaller than the upper limit of the required frequency characteristic, thereby decreasing an unnecessary signal due to external vibration.

A tuning fork type vibration gyro of a twelfth aspect, which accords with the eleven aspect, is characterized in that the absolute value of the difference is at least three times the upper limit of the required frequency characteristic.

In the tuning fork type vibration gyro of the twelfth aspect, the absolute value of the difference is arranged to be at least three times the upper limit of the required frequency characteristic, thereby producing a great effect of decreasing an unnecessary signal due to external vibration.

A tuning fork type vibration gyro of a thirteenth aspect, which is a tuning fork type vibration gyro comprising: a tuning fork type vibrator including two arms and a base; a circuit for exiting drive vibration: a detection circuit for detecting detection vibration that occurs when a rotational angular velocity is applied; and a signal processing circuit for converting a detection signal of the detection circuit into a digital signal and processing the digital signal, wherein a sampling frequency of the signal processing circuit is greater than two times a reciprocal number of an integral time in the signal processing, is characterized in that an absolute value of a difference between a resonant frequency of the drive vibration and a resonant frequency of the detection vibration is greater than the reciprocal number of the integral time.

In the tuning fork type vibration gyro of the thirteenth aspect, the sampling frequency of the digital signal processing circuit of a detection system is arranged to be greater than two times the reciprocal number of the integral time in the signal processing, and the absolute value of the difference between the resonant frequency of drive vibration and the resonant frequency of detection vibration is arranged to be greater than the reciprocal number of the integral time, thereby decreasing an unnecessary signal due to external vibration.

BRIEF DESCRIPTION OF THE DRAWINGS

FIG. 14 is a table showing the results of experiments related to the hardness of the oscillation limiting member;

PREFERRED EMBODIMENTS OF THE INVENTION

The following description will specifically explain an embodiment of the present invention with reference to the drawings.

Figure 8:
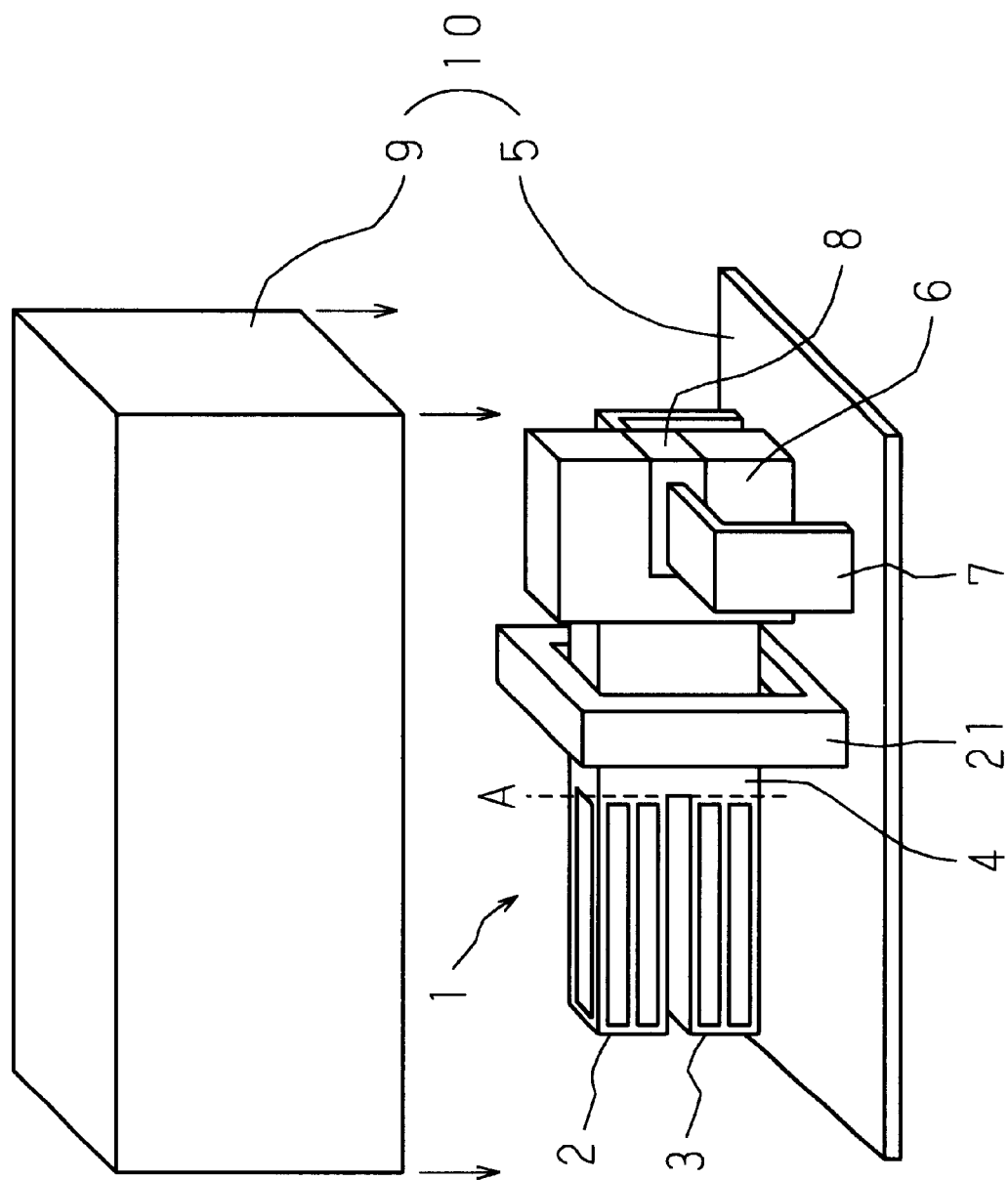
FIG. 8 is a structural view of an example of a tuning fork type vibration gyro of the present invention.

FIG. 8 is a structural view of an example of a tuning fork type vibration gyro of the present invention. In FIG. 8, numeral 1 is a tuning form type vibrator. The tuning form type vibrator 1 has two arms 2, 3 and a base 4 for supporting the arms 2 and 3. The arms 2, 3 and base 4 are formed in one-piece by processing a piezoelectric monocrystal such as $LiTaO_3$, $LiNbO_3$, etc. By coupling the base 4 of this tuning fork type vibrator 1 to a supporting substrate 6 provided on a stem 5, the tuning fork type vibrator 1 is supported.

Moreover, a horizontal section of a supporting arm 7 having a substantially U-shaped cross section is inserted into a slit of the supporting substrate 6 formed to include the center of rotational motion of the supporting substrate 6, and attached flexibly to the supporting substrate 6 through an adhesive layer 8 formed of a rubber-like elastic body. Both of the end sections of the supporting arm 7 are provided with a protrusion, and these protrusions are inserted into holes formed in the stem 5. Furthermore, in order to cover and protect these members, a cap 9 is provided. The cap 9 and the stem 5 form a case 10.

Besides, an oscillation limiting member 21 in a ring shape (a hollow rectangular parallelepiped shape) is mounted with its one face secured to the stem 5 in such a manner that the oscillation limiting member 21 surrounds the base 4. Further, this oscillation limiting member 21 needs to be provided at a position where almost no in-plane vibration occurs, i.e., at a position to the base 4 from the joint section of the arms 2 and 3 (the boundary section between the arms 2, 3 and the base 4 shown by a broken line A in FIG. 8). It is thus possible to provide the oscillation limiting member 21 on an arbitrary position on the base 4.

In such a tuning fork type vibrator 1, similarly to the prior arts, when drive vibration (in-plane vibration) is exited and a rotational angular velocity is applied, detection vibration (plane-vertical vibration) occurs, and then an output signal proportional to the magnitude of this vibration is detected so as to find the angular velocity.

Figure 1:
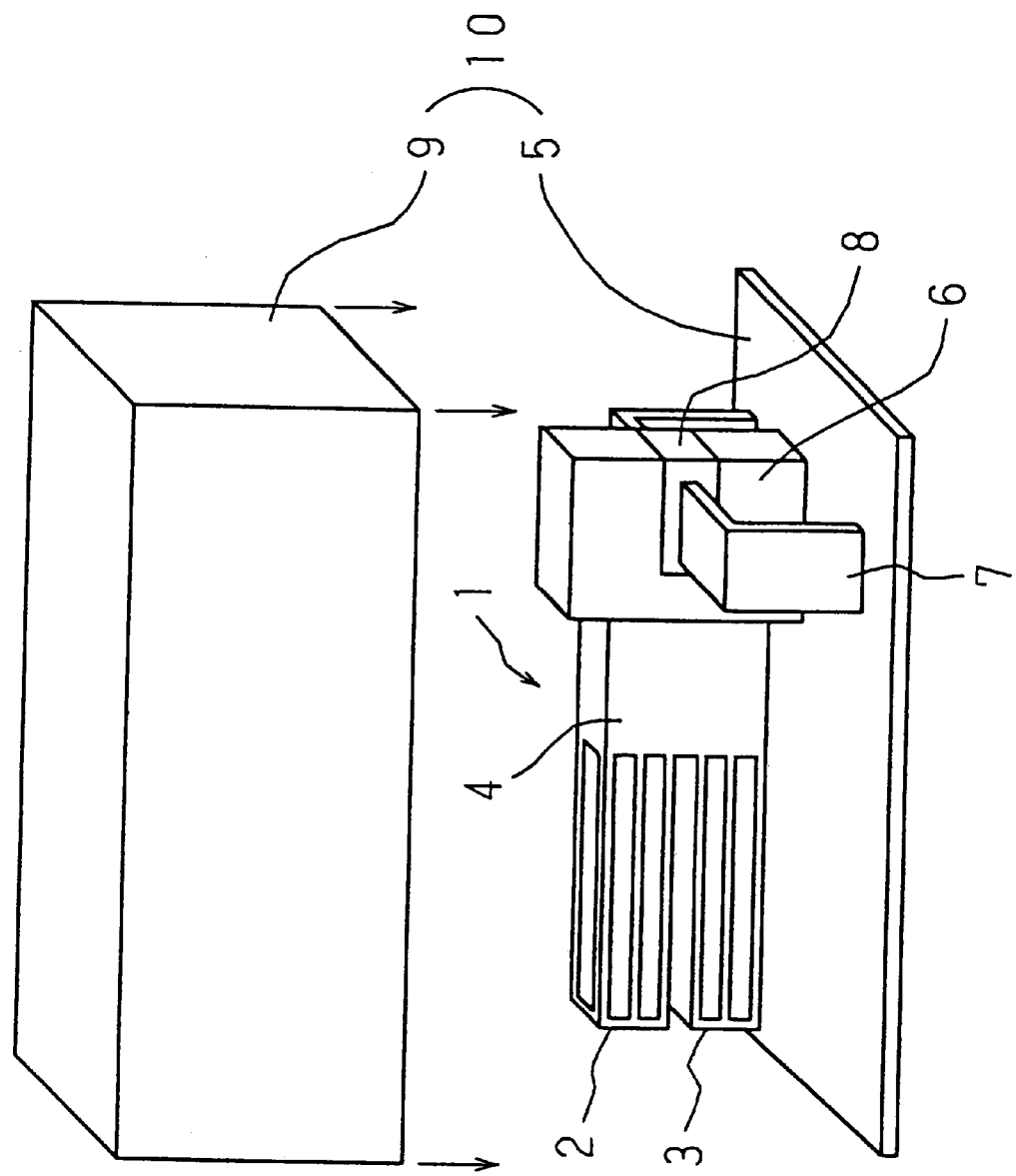
FIG. 1 is a structural view of a prior art tuning fork type vibration gyro.
Figure 2A:
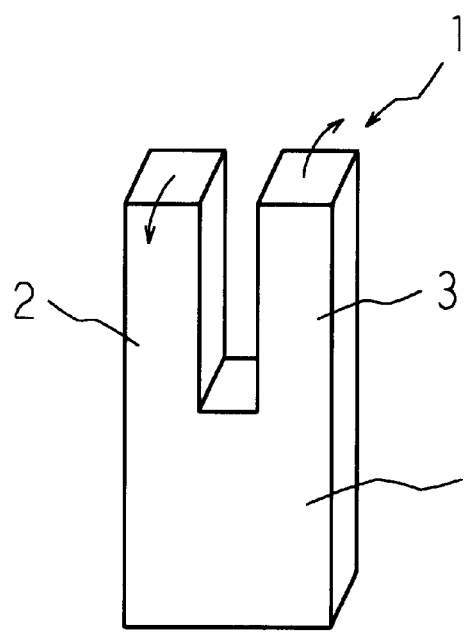
FIGS. 2(*a*) and 2(*b*) are views showing vibration states of a tuning fork type vibrator.
Figure 2B:
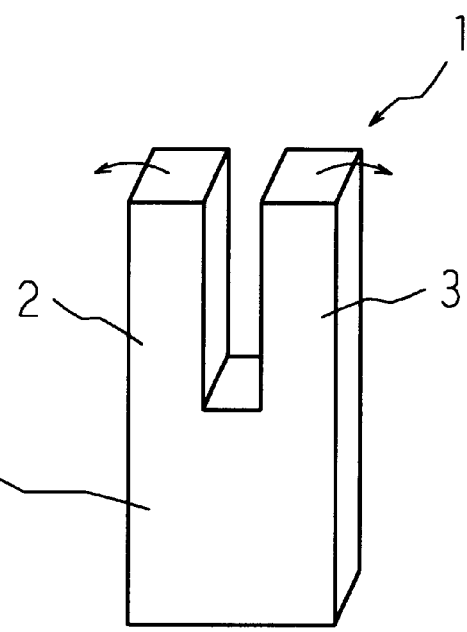
Figure 3A:
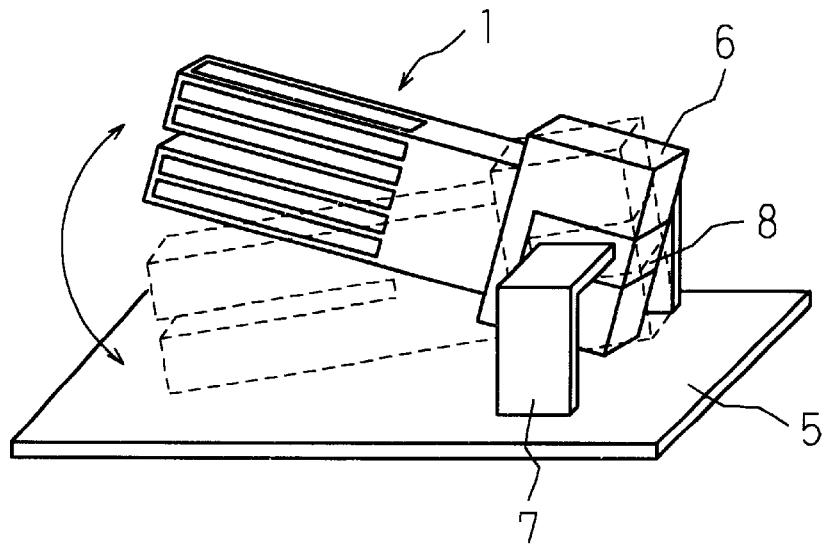
FIGS. 3(*a*) and 3(*b*) are views showing oscillating motion of the tuning fork type vibrator caused by external vibration or impact.
Figure 3B:
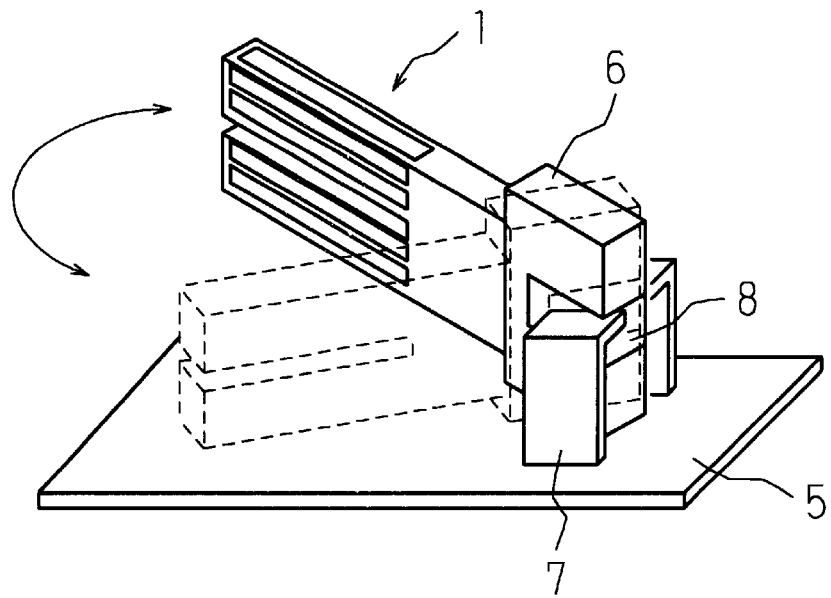
Figure 4A:
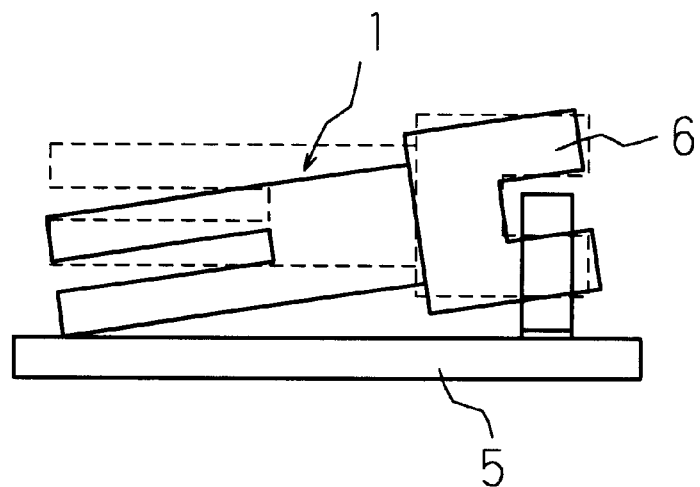
FIGS. 4(*a*) and 4(*b*) are views showing states in which the tip of an arm is in contact with a case.
Figure 4B:
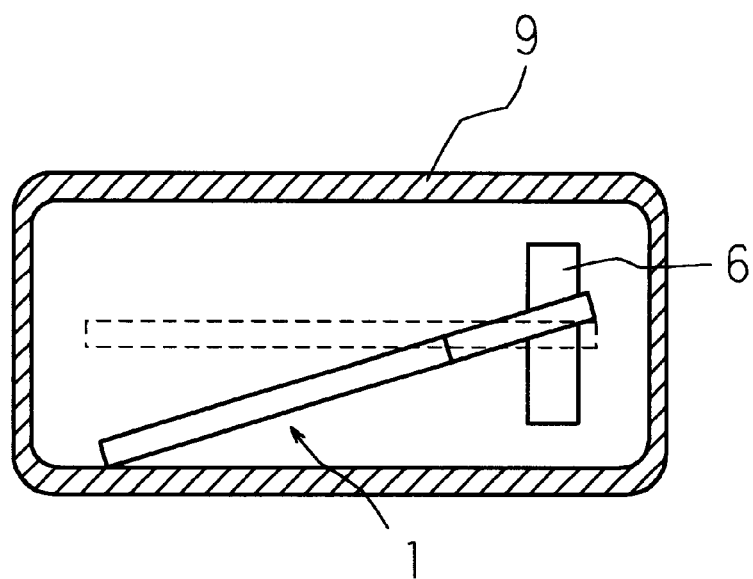
Figure 5A:
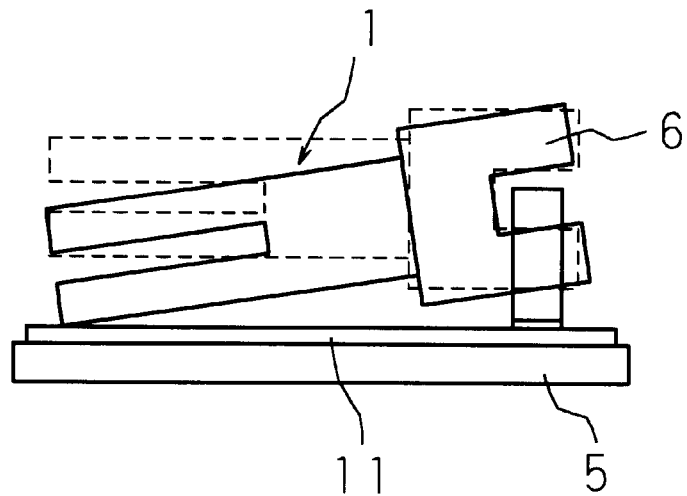
FIGS. 5(*a*) and 5(*b*) are views showing states in which the tip of the arm is in contact with a circuit substrate.
Figure 5B:
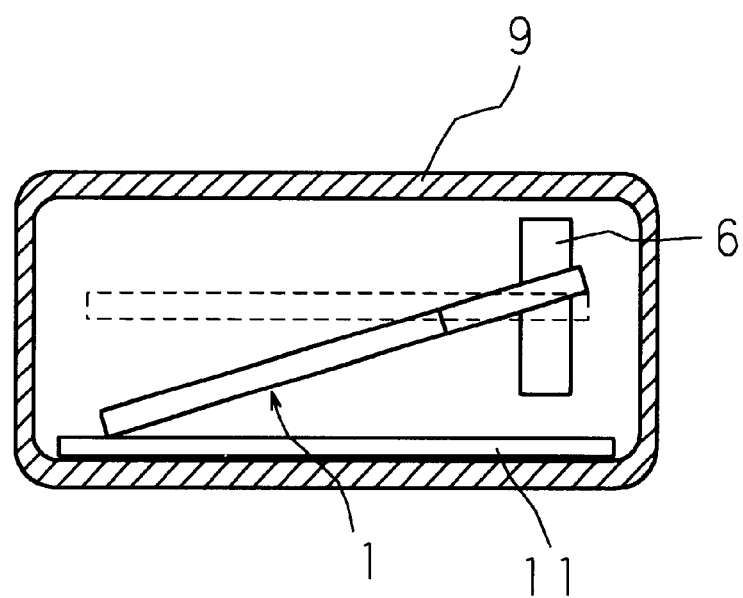
Figure 6:
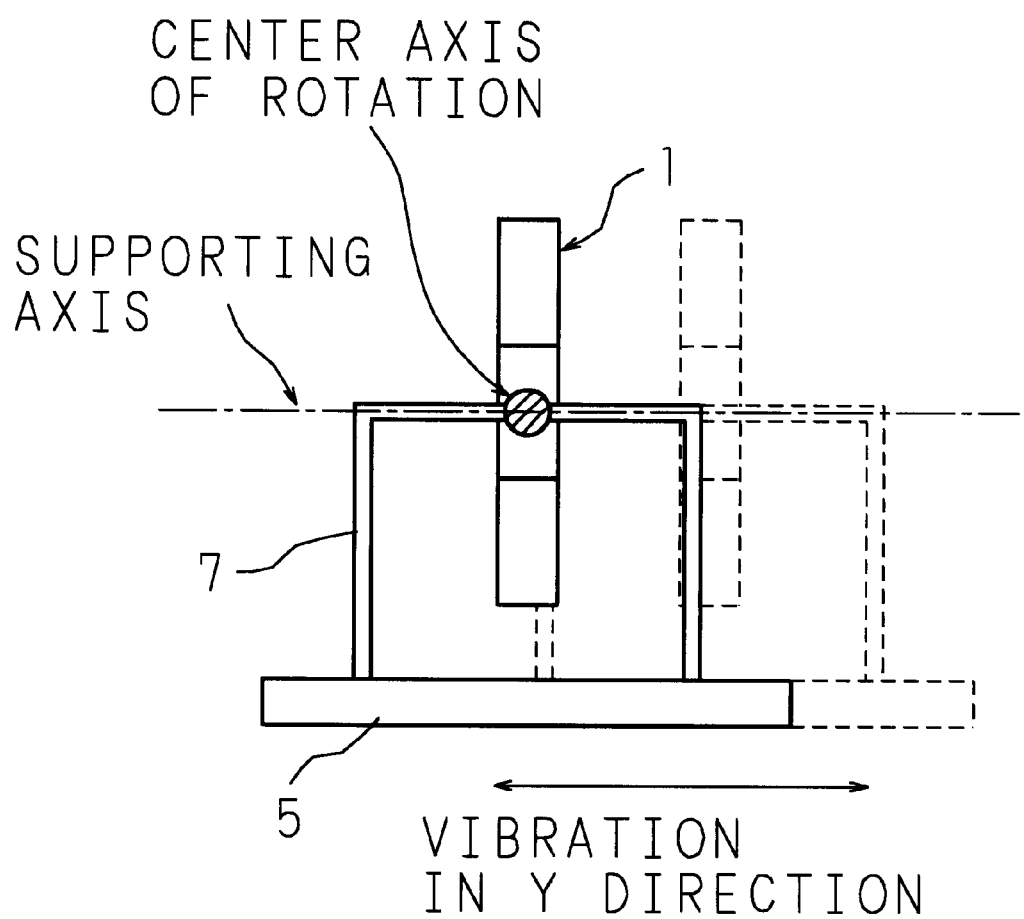
FIG. 6 is a view showing a translation motion of the tuning fork type vibrator caused by external vibration.
Figure 7:
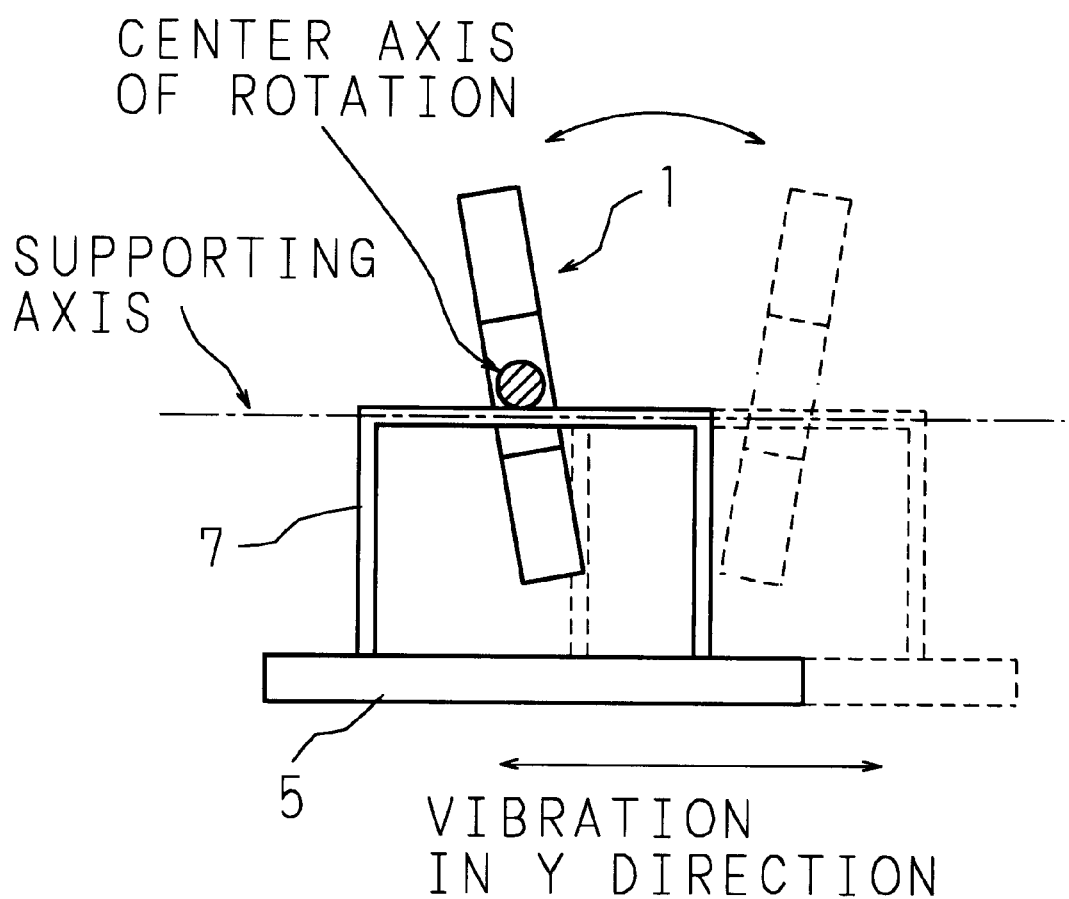
FIG. 7 is a view showing a rotational motion of the tuning fork type vibrator caused by external vibration.

As described above, when external vibration or impact was applied to a prior art tuning fork type vibration gyro as shown in FIG. 1, the tuning fork type vibrator 1 oscillated in response to the vibration or impact, and sometimes bumped against the surrounding members. In contrast, in the tuning fork type vibration gyro of the present invention as shown in FIG. 8, the oscillation limiting member 21 is mounted to surround the base 4. Therefore, even when the tuning fork type vibrator 1 is caused to oscillate by the application of external vibration or impact, since the oscillation range of the tuning fork type vibrator 1 is limited by the presence of the oscillation limiting member 21, it is possible to prevent the tuning fork type vibrator 1 from bumping against the surrounding members such as the stem 5 and the cap 9. As a result, the gyro characteristic is not impaired, and there is no possibility of losing the gyro function due to a stop of drive vibration.

Besides, in the example shown in FIG. 8, although the oscillation limiting member 21 is provided to surround the base 4 (tuning fork type vibrator 1), it is also possible to provide such an oscillation limiting member 21 to surround the supporting substrate 6 or the adhesive layer 8.

Figure 9A:
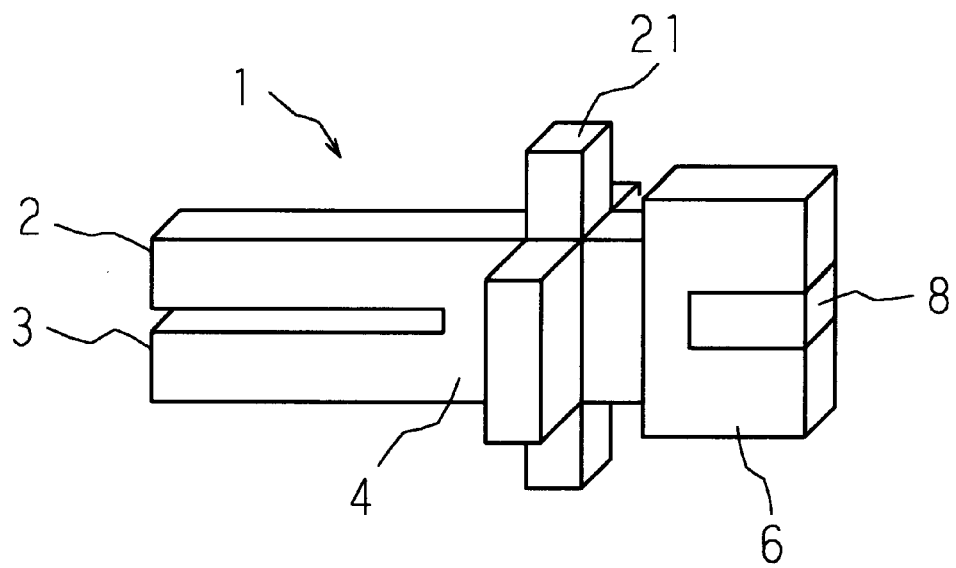
FIGS. 9(*a*) and 9(*b*) are structural views of the characteristic portions of another examples of the tuning fork type vibration gyro of the present invention.
Figure 9B:
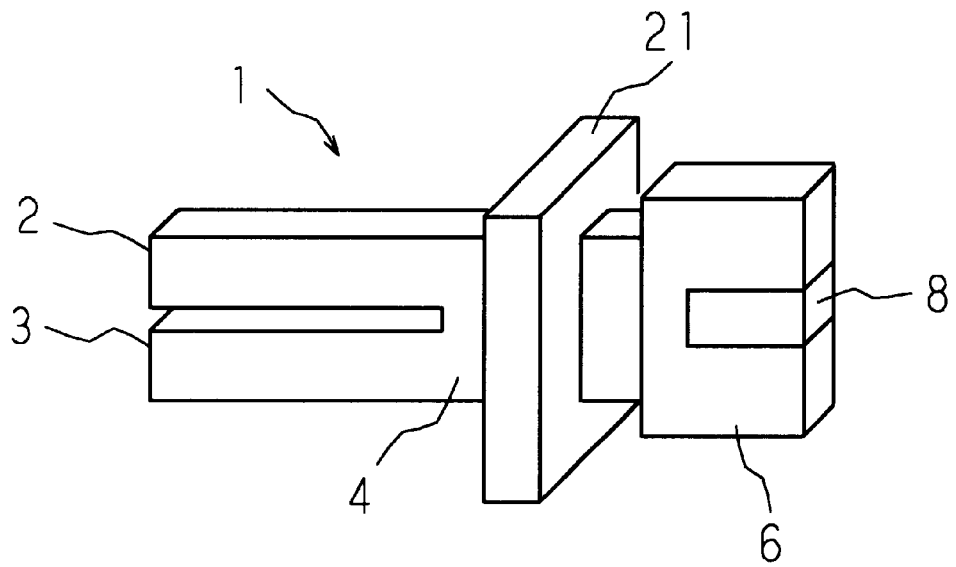

FIGS. 9(a) and 9(b) are structural views of the characteristic portions of another examples of the tuning fork type vibration gyro of the present invention. In each of the examples shown in FIGS. 9(a) and 9(b), the oscillation limiting member 21 is formed directly on the base 4. In the example shown in FIG. 9(a), the oscillation limiting member 21 extended in both of the X and Y directions is formed on the base 4. In the example shown in FIG. 9(b), the oscillation limiting member 21 in the shape of a ring is formed directly on the base 4.

In such structures, even when the tuning fork type vibrator 1 is caused to oscillate to a large extent by external vibration or impact, since the oscillation limiting member 21 comes into contact with the surrounding members such as the stem 5 and the cap 9 prior to the tuning fork type vibrator 1, it is possible to prevent the tuning fork type vibrator 1 from bumping against the surrounding members.

Further, although this is not shown in the drawings, the oscillation limiting member 21 having the same shape as those shown in FIGS. 9(a) and 9(b) may be formed on the supporting substrate 6.

Figure 10A:
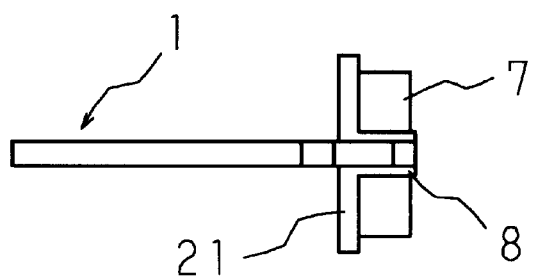
FIGS. 10(*a*) through 10(*c*) are structural views of the characteristic portions of still another example of the tuning fork type vibration gyro of the present invention.
Figure 10B:
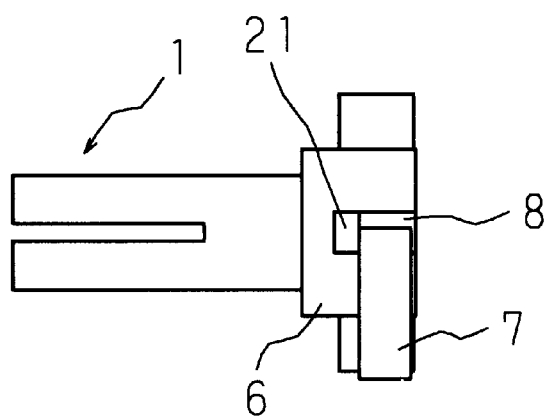
Figure 10C:
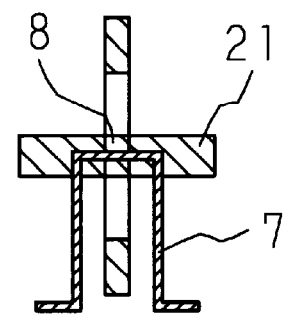

FIGS. 10(a) through 10(c) are structural views of the characteristic portions of still another example of the tuning fork type vibration gyro of the present invention. In this example, the oscillation limiting member 21 and the adhesive layer 8 for bonding the supporting substrate 6 and supporting arm 7 are formed in one-piece. Also, in this example, when the tuning fork type vibrator 1 oscillates to a large extent, the oscillation limiting member 21 comes into contact with the surrounding members first, thereby preventing the tuning fork type vibrator 1 from bumping against the surrounding members.

In all of the examples shown in FIGS. 10(a) through 10(c), although the oscillation limiting member 21 is mounted on the supporting substrate 6, it is possible to mount the upper and lower portions of the oscillation limiting member 21 on the base 4. Further, this oscillation limiting member 21 may be formed in the shape of a ring.

Figure 11:
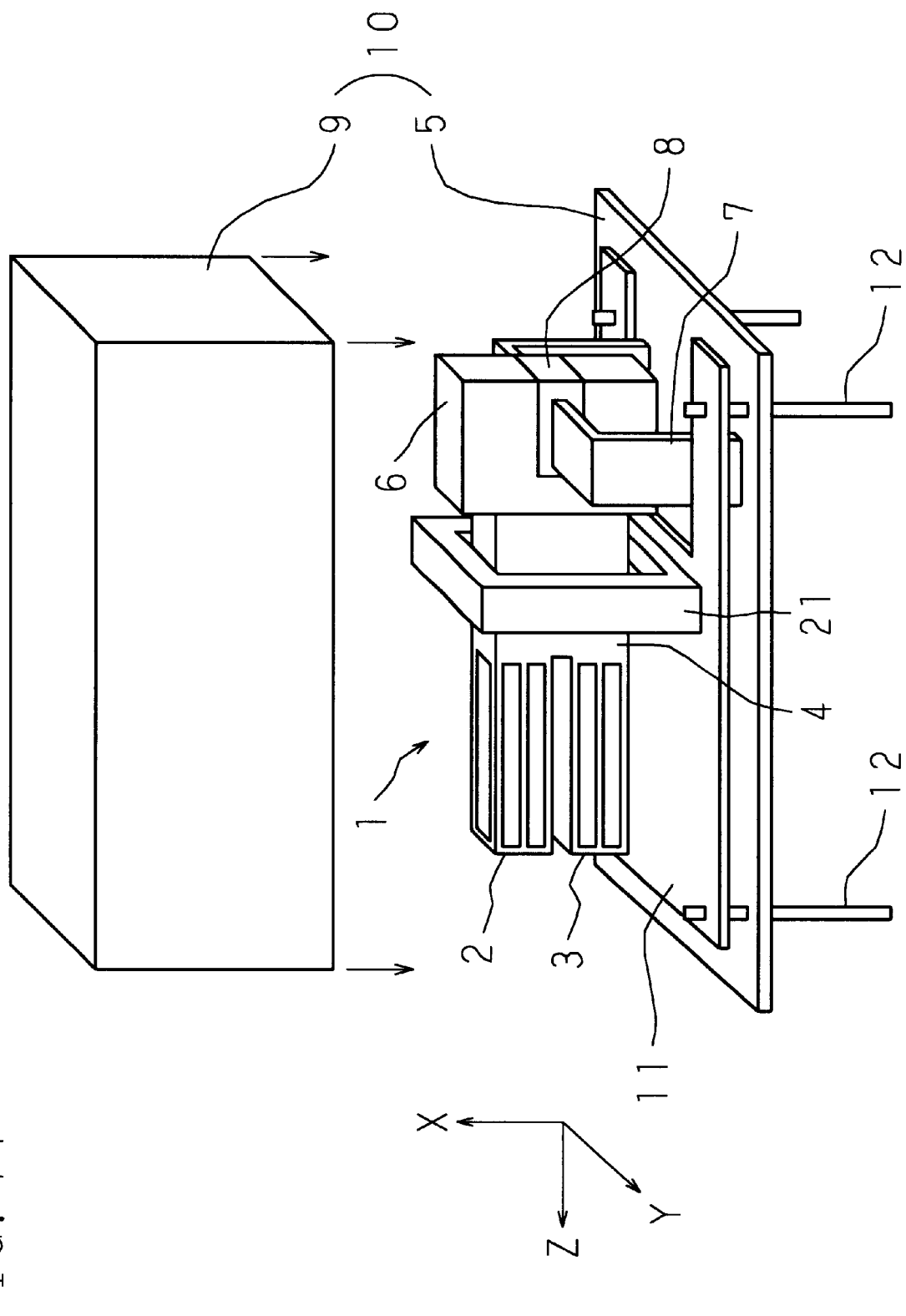
FIG. 11 is a structural view of yet another example of the tuning fork type vibration gyro of the present invention.

FIG. 11 is a structural view of yet another example of the tuning fork type vibration gyro of the present invention. In FIG. 11, the same parts as those shown in FIG. 8 are designated by the same numerals, and the explanation thereof will be omitted. In this example, a circuit substrate 11 including a drive circuit for exciting drive vibration and a detection circuit for processing a detection signal is housed in the case 10 formed by the stem 5 and the cap 9. The circuit substrate 11 is present between the stem 5 and the tuning fork type vibrator 1, and a terminal pin 12 for achieving electrical connection to an external circuit is attached to pierce the stem 5. In the same manner as shown in FIG. 8, the oscillation limiting member 21 is provided to surround the base 4. The lower face of this oscillation limiting member 21 is secured to the circuit substrate 11.

In such a structure, the oscillation range of the tuning fork type vibrator 1 is limited by the oscillation limiting member 21 and, even when the tuning fork type vibrator 1 oscillates to a large extent, it is possible to prevent the tuning fork type vibrator 1 from bumping against the surrounding members such as the circuit substrate 11 and the cap 9.

Figure 12:
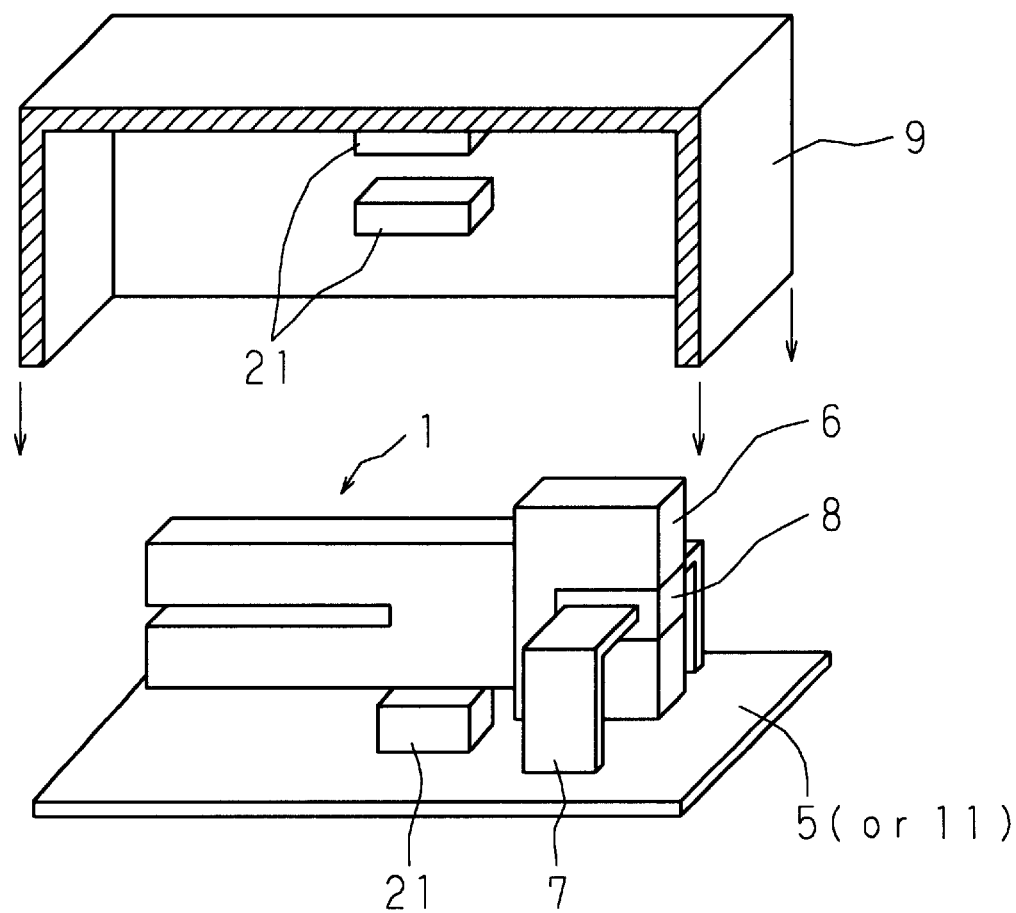
FIG. 12 is a structural view of yet another example of the tuning fork type vibration gyro of the present invention.

FIG. 12 is a structural view of yet another example of the tuning fork type vibration gyro of the present invention. In FIG. 12, the same parts as those shown in FIG. 8 are designated by the same numerals, and the explanation thereof will be omitted. In this example, a plurality of oscillation limiting members 21 are provided. In the example shown in FIG. 12, there are provided one oscillation limiting member 21 secured to the stem 5 (or the circuit substrate 11) at a lower portion of the tuning fork type vibrator 1 and two oscillation limiting members 21 secured to the inner wall surface of the cap 9.

Thus, in the case where the oscillation limiting member 21 is provided between the tuning fork type vibrator 1 and the case 10 and/or between the tuning fork type vibrator 1 and the circuit substrate 11, it is necessary to design the position and shape of the oscillation limiting member 21 so that the portion (each tip portion of the arms 2 and 3) which comes into contact with the surrounding members first does not come into contact with the surrounding members (the case 10 and the circuit substrate 11), i.e., the clearance between the arm 2, 3 and the case 10 and/or the clearance between the arm 2, 3 and the circuit substrate 11 is not smaller than a predetermined value.

Figure 13:
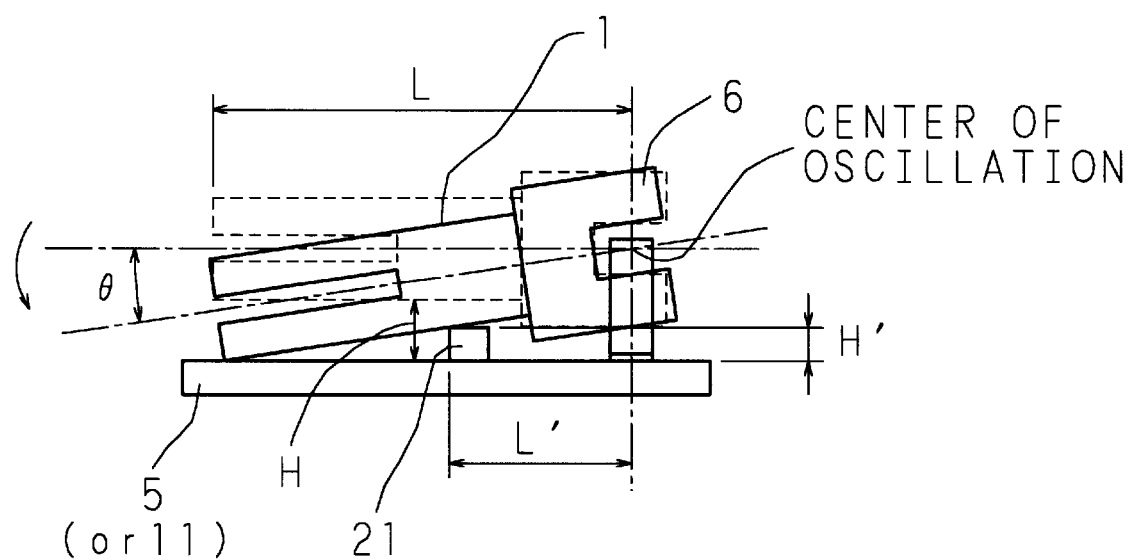
FIG. 13 is an explanatory view for prescribing the position and shape of an oscillation limiting member.

FIG. 13 is a depiction showing an example in which the oscillation limiting member 21 is provided at a lower portion of the tuning fork type vibrator 1, and each tip portion of the arms 2 and 3 is prescribed so that it can never come into contact with the stem 5 (or each circuit substrate 11). The position and shape of the oscillation limiting member 21 are designed to satisfy the following equations (A) and (B) simultaneously.

$$H = L \times \sin\theta > 0 \quad \text{(A), and}$$

$$\tan\theta = (H - H')/L' \quad \text{(B)}$$

where H is the distance between the tuning fork type vibrator 1 and the stem 5 (or the circuit substrate 11), L is the distance between the center of oscillation of the tuning fork type vibrator 1 and supporting member 6 and each tip of the arms 2 and 3, H' is the distance between the stem 5 (or the circuit substrate 11) and a position at which the tuning fork type vibrator 1 or the supporting member 6 comes into contract with the oscillation limiting member 21 when the tuning fork type vibrator 1 oscillates, and L' is the distance between the center of oscillation of the tuning fork type vibrator 1 and supporting member 6 and a position at which the tuning fork type vibrator 1 or the supporting member 6 comes into contract with the oscillation limiting member 21 when the tuning fork type vibrator 1 oscillates.

If the position and shape of the oscillation limiting member 21 are designed to satisfy the above equations (A) and (B), each tip portion of the arms 2 and 3 can never come into contact with the stem 5 (or the circuit substrate 11). Therefore, the minimum value of the height of the oscillation limiting member 21 in the case when each tip portion of the arms 2 and 3 does not come into contact with the stem 5 (or the circuit substrate 11) can be prescribed by equations (A) and (B). Accordingly, the oscillation limiting member 21 with the minimum height can be provided, thereby reducing the cost of the raw material and the weight of the oscillation limiting member 21.

Incidentally, in the above example, the criteria for designing the position and shape of the oscillation limiting member 21 when the oscillation limiting member 21 is provided at a lower portion of the tuning fork type vibrator 1 are illustrated. However, even when the oscillation limiting member 21 is provided on the inner wall of the case 10 (the cap 9), the position and shape of the oscillation limiting member 21 can be designed in the same manner.

Here, the material used for the oscillation limiting member 21 and the hardness of the material will be explained. As the material for the oscillation limiting member 21, it is possible to use the elastic body of a resin such as epoxy and urethane, a rubber such as silicone and butyl, or the foam material thereof. With the use of such a material, it is possible to readily mass-produce the oscillation limiting member 21 having a complicated shape by using jigs in advance. Hence, even when the oscillation limiting member 21 is mounted, the tuning fork type vibration gyro can be easily assembled, thereby contributing to a reduction in the man-hour and cost.

In the structure shown in FIG. 13, experiments were carried out to find whether the arms 2 and 3 are broken by the application of constant external impact of 1500 (G) in the Y direction in which the tuning fork type vibrator 1 is most likely to oscillate, while changing the hardness of the oscillation limiting member 21. The results are shown in FIG. 14. In an example (comparative example) in which the oscillation limiting member 21 was not provided, the arms 2 and 3 bumped against the surrounding members and were broken. On the other hand, when the hardness of the oscillation limiting member 21 was 102 (JIS A), the arms 2 and 3 did not bump against the surrounding members, but were broken by the impact of the contact with the oscillation limiting member 21 because the oscillation limiting member 21 itself was hard and had less elasticity. Thus, it will be appreciated that the formation of the oscillation limiting member 21 by an elastic body with a hardness of 100 (JIS A) or less prevents the arms 2 and 3 from being broken and is effective for preventing destruction of the tuning fork type vibrator 1. Further, it is possible to use an airtight container containing a material with a small hardness (for example, 0 (JIS A)) as the oscillation limiting member 21.

The structure using such an oscillation limiting member 21 is particularly effective for a tuning fork type vibration gyro in which a tuning fork type vibrator 1 inevitably oscillates in response to external vibration or impact and a supporting section of the tuning fork type vibrator 1 is an elastic body. The tuning fork type vibration gyro of the present invention has a structure which does not reduce or absorb external vibration or impact as in the prior art gyros, but limits the oscillation range of the tuning fork type vibrator 1 by the oscillation limiting member 21. Thus, the tuning fork type vibration gyro of the present invention deals with the external vibration or impact differently from the prior arts 1 and 2. Additionally, the present invention does not require the work cover, work plate, shield cover, cushioning material, etc. as illustrated in the prior arts 1 and 2, thereby achieving a significant reduction in the size.

The following description will explain the tuning fork type vibration gyro of the present invention that can decrease an unnecessary signal produced by the application of external vibration.

Figure 15:
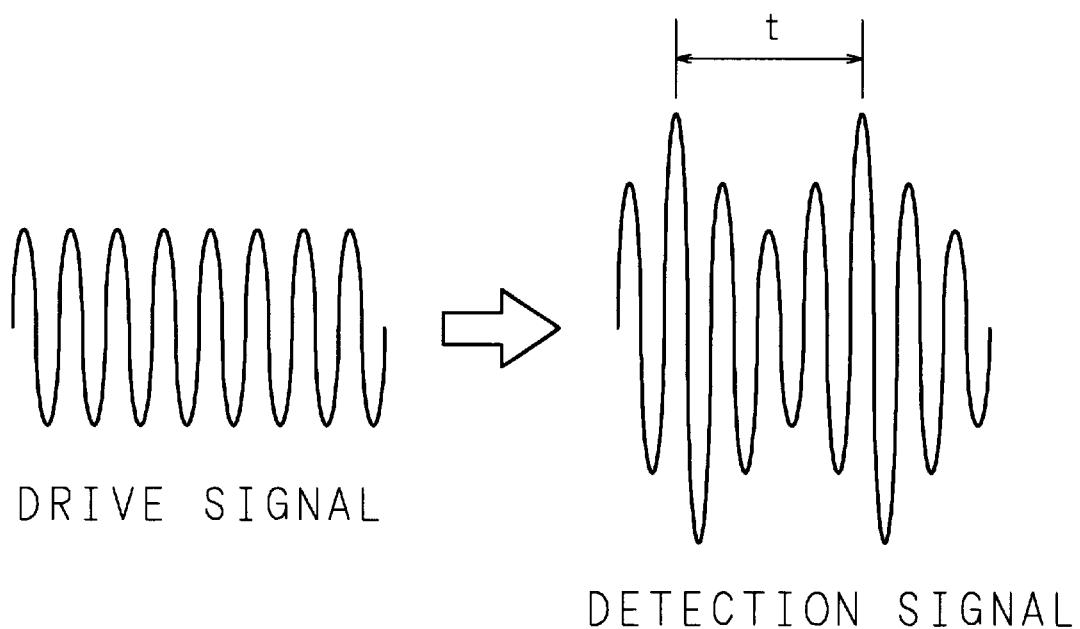
FIG. 15 is a view showing the relationship between a drive signal and a detection signal in the tuning fork type vibration gyro.

FIG. 15 is a view showing the relationship between a drive signal and a detection signal in the tuning fork type vibration gyro. When a rotational motion is applied, as shown in FIG. 15, the detection signal of the gyro becomes an AM modulated wave produced by superimposing a detection wave of a cycle t on a signal having a drive frequency.

Figure 16:
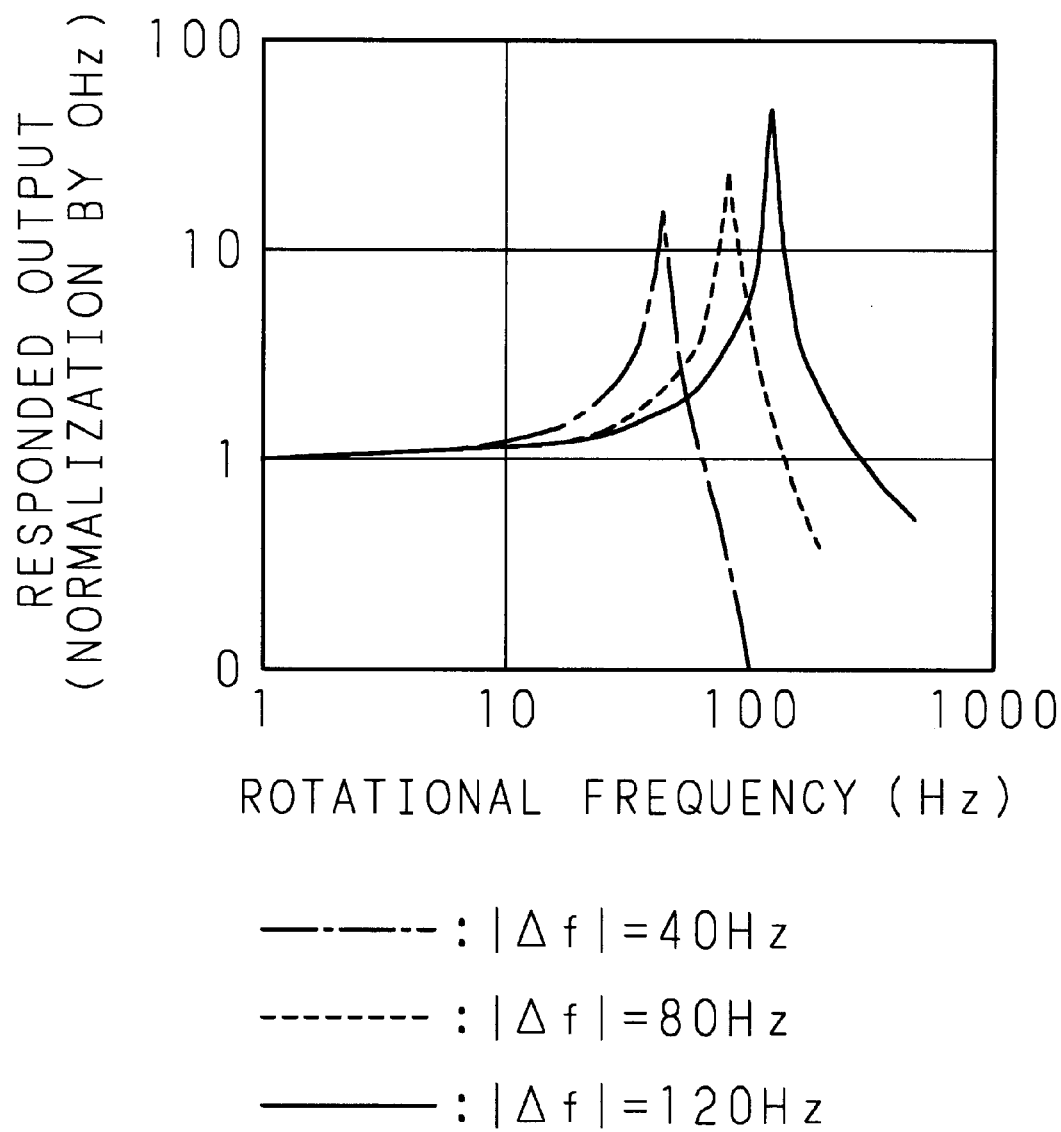
FIG. 16 is a graph showing the relationship between a rotational frequency and a responded output in the tuning fork type vibration gyro.

Besides, FIG. 16 is a graph showing the relationship between a rotational frequency applied to the tuning fork type vibration gyro and a responded output. The graph of FIG. 16 shows the characteristics when the absolute value of the difference Δf between a resonant frequency of drive vibration and a resonant frequency of detection vibration takes three kinds of values (40 Hz, 80 Hz, 120 Hz). As shown in FIG. 16, the frequency characteristic of the tuning fork type vibrator 1 is determined by |Δf|, and the responded output exhibits a peak when a rotation of a frequency in the vicinity of |Δf| is applied. Hence, if |Δf| is made smaller than the upper limit Fmax of a required frequency characteristic of the tuning fork type vibration gyro, a frequency response characteristic including the peak portion is exhibited, and external vibration is also detected as a large amplitude. For this reason, in the present invention, |Δf| is made equal to or greater than the upper limit Fmax of the required frequency characteristic and a LPF (low-pass filter) of the circuit is used so as to obtain a flat frequency response characteristic for values smaller than Fmax.

Figure 17:
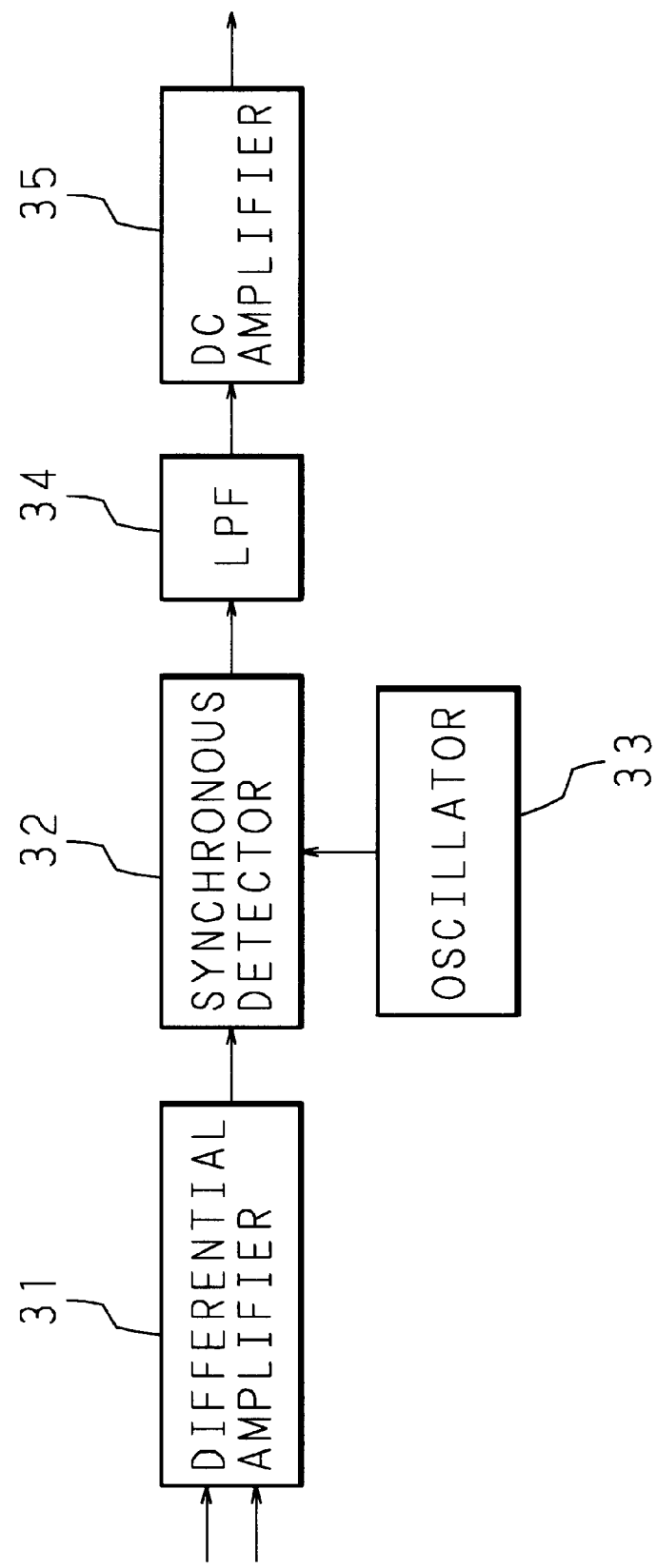
FIG. 17 is a structural view of an analog detection circuit of the tuning fork type vibration gyro.

FIG. 17 is a structural view of an analog detection circuit using such a LPF. This analog detection circuit includes a differential amplifier 31 for inputting detection voltage signals of two series of detection electrodes provided on the arms 2 and 3 and for outputting a signal proportional to the difference between the two inputs, a synchronous detector 32 for synchronous-detecting the output signal from the differential amplifier 31, an oscillator 33 for oscillating a reference clock serving as a synchronous signal and outputting the resultant signal to the synchronous detector 32, a LPF 34 having a predetermined filter characteristic (cut-off frequency Fc), and a DC amplifier 35 for amplifying the output of the LPF 34.

Figure 18A:
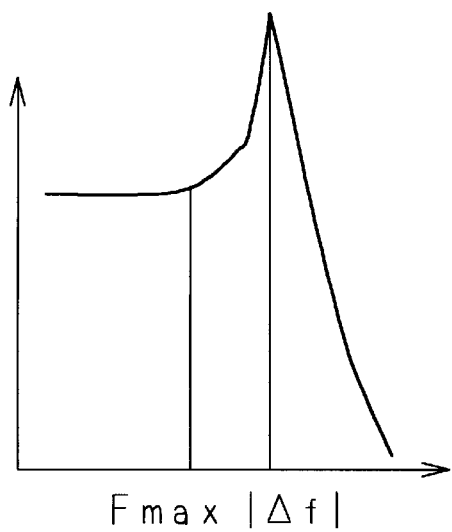
FIGS. 18(*a*) through 18(*c*) are views showing the synthesis of a frequency response characteristic in the analog detection circuit.
Figure 18B:
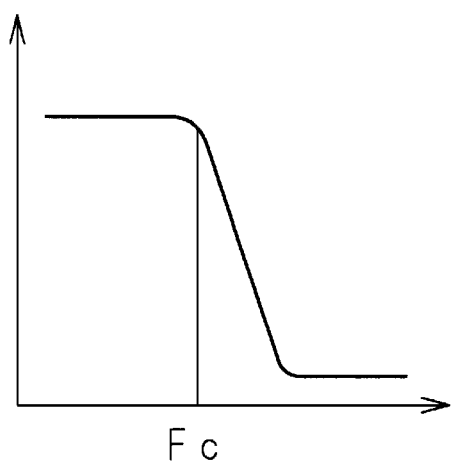
Figure 18C:
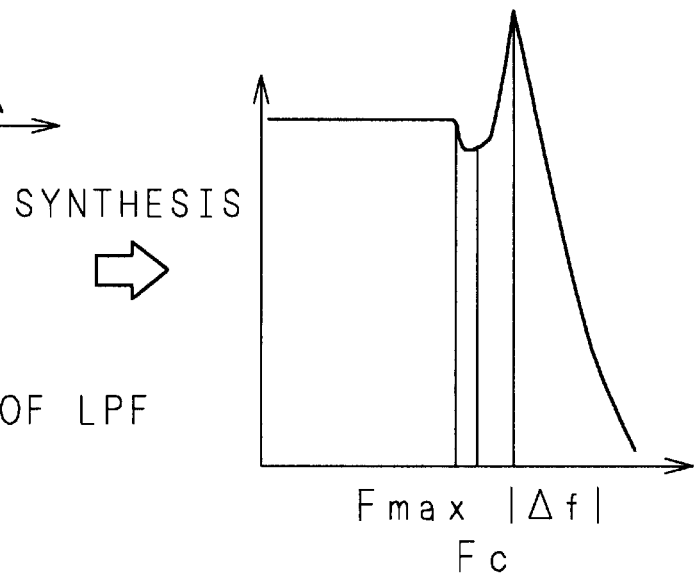

FIGS. 18(a) through 18(c) are views showing the synthesis of a frequency response characteristic in such an analog detection circuit, wherein FIG. 18(a) shows an example of the angular velocity frequency characteristic of the tuning fork type vibrator 1, FIG. 18(b) shows an example of the frequency characteristic of the LPF 34 and FIG. 18(c) shows an example of an actual frequency response characteristic of the tuning fork type vibration gyro. Here, in accordance with Fmax, if |Δf| is made slightly greater than Fmax and the cut-off frequency Fc of the LPF 34 is made slightly greater than Fmax, the actual frequency response characteristic of the tuning fork type vibration gyro (FIG. 18(c)) is a synthesis of the frequency characteristic of the tuning fork type vibrator 1 (FIG. 18(a)) and the frequency characteristic of the LFP 34 (FIG. 18(b)), and has a large peak at a frequency of no lower than Fmax. Moreover, external vibration has a large amplitude at a frequency substantially equal to this peak portion.

Therefore, in order to decrease an unnecessary signal as noise produced by external vibration, it is necessary to make |Δf| sufficiently larger than Fmax. Here, since it is considered that Fc corresponds to Fmax, they may take substantially the same numerical value. Thus, by making |Δf| sufficiently larger than Fc, the above-mentioned unnecessary signal can be decreased.

Figure 19A:
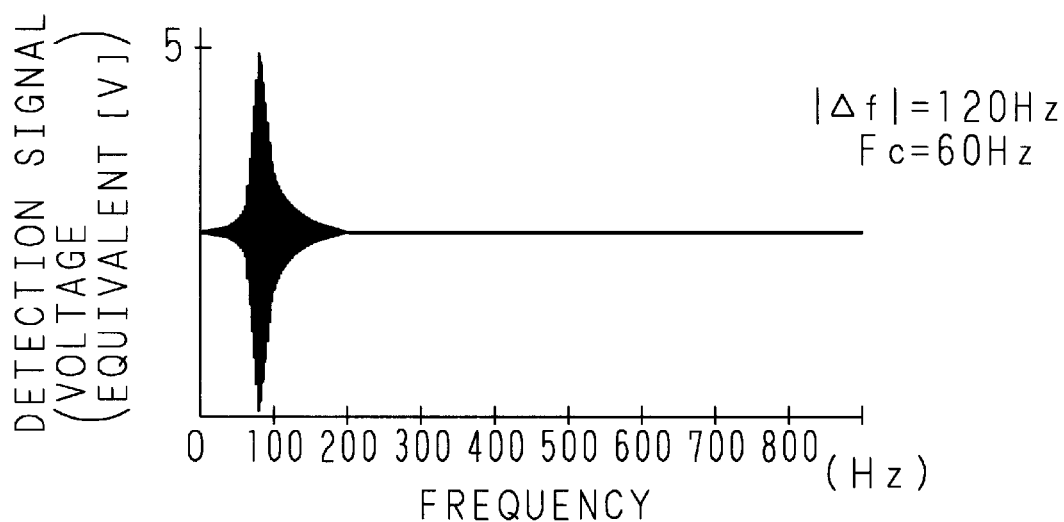
FIGS. 19(*a*) through 19(*c*) show the results of experiments on a detection signal (voltage equivalent) when external vibration was applied to the tuning fork type vibration gyro.
Figure 19B:
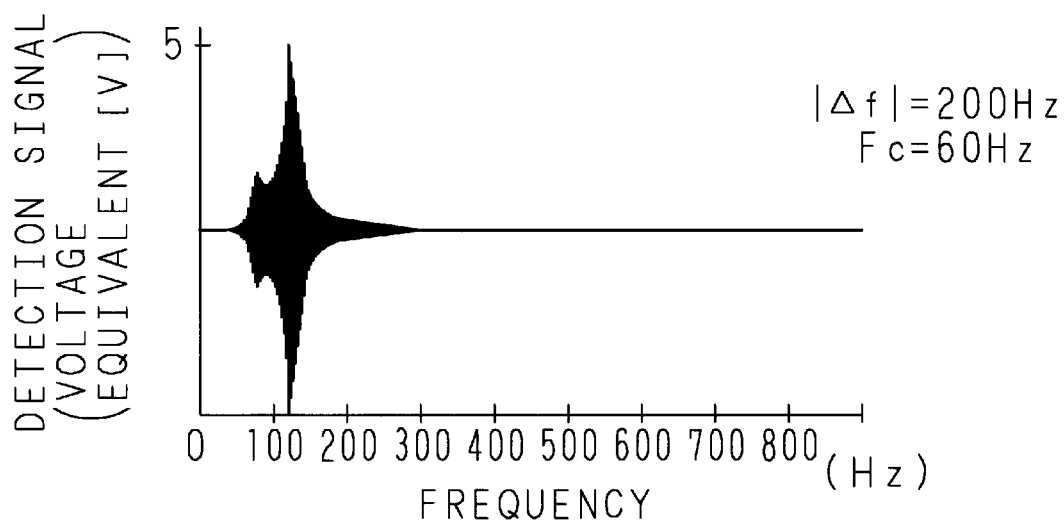
Figure 19C:
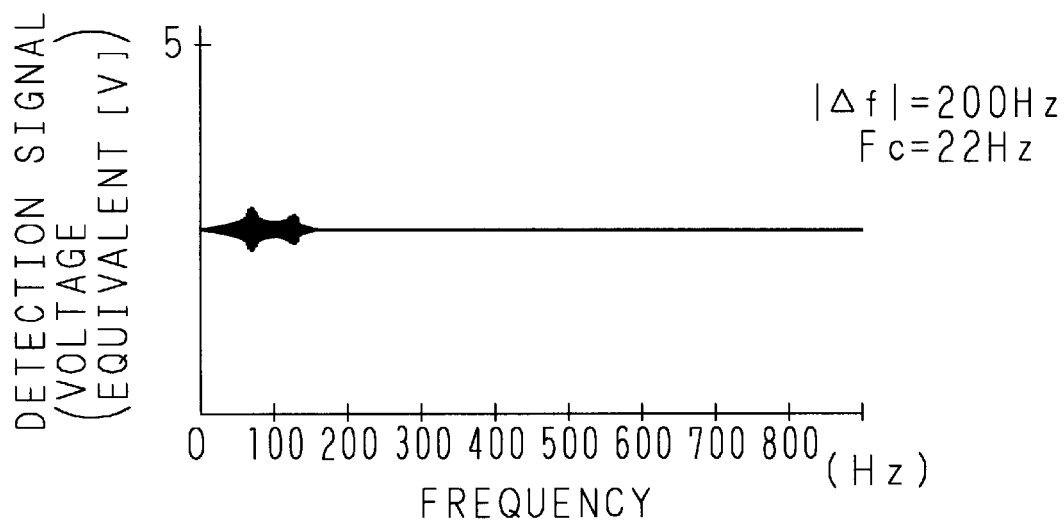

FIGS. 19(a) through 19(c) are views showing detection signals (voltage equivalent) when external vibration was experimentally applied to the tuning fork type vibration gyro in which |Δf| and Fc were varied. FIGS. 19(a), 19(b) and 19(c) show the results of experiments when |Δf|=120 Hz and Fc=60 Hz, when |Δf|=200 Hz and Fc=60 Hz, and when |Δf|=200 Hz and Fc=22 Hz, respectively. It was confirmed that the unnecessary signal was significantly decreased when |Δf|>3×Fc (FIG. 19(b)) in comparison with |Δf|=2×Fc (FIG. 19(a)). Furthermore, it was confirmed that the unnecessary signal was decreased rapidly when a condition |Δf|>9×Fc (FIG. 19(c)) was satisfied.

Next, the following description will explain a tuning fork type vibration gyro including a digital signal processing circuit for converting an analog detection signal into a digital signal and processing the digital signal.

Figure 20:
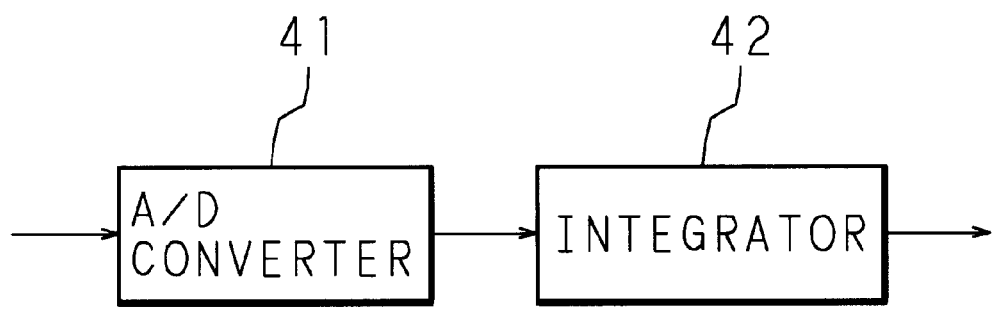
FIG. 20 is a structural view of a digital signal processing circuit of the tuning fork type vibration gyro.

FIG. 20 is a structural view of such a digital signal processing circuit. This digital signal processing circuit includes an A/D converter 41 for converting an input analog detection signal into a digital signal, and an integrator 42 for integrating the output of the A/D converter 41 for a predetermined period of time.

As described above (see FIG. 15), the analog detection signal of the tuning fork type vibration gyro is configured by adding a detection wave of a cycle t derived from a rotational motion to a drive signal. Hence, in order to effectively eliminate an unnecessary rotational angular velocity signal, at least an integral time equal to or more than a half cycle (t/2) of the detection wave is required in the digital signal processing circuit of the detection system, and also a sampling frequency fs which is not smaller than the reciprocal number (2/t) of the integral time is required. Here, the upper limit of a detectable angular frequency (required frequency characteristic), i.e., the maximum value of 1/t, is not greater than the absolute value of the above-mentioned Δf. Therefore, by satisfying the conditions fs>t/2 and |Δf|>1/t simultaneously, it is possible to effectively eliminate the unnecessary signal.

Figure 21:
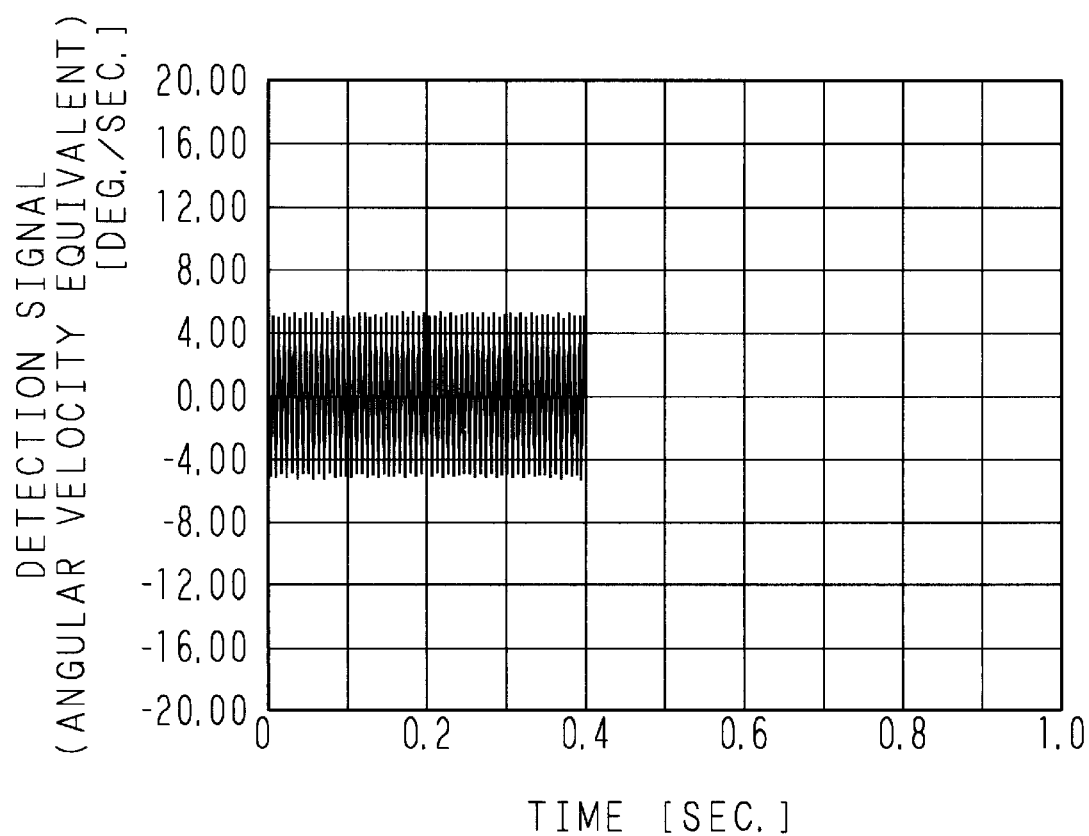
FIG. 21 is a view showing the result of an experiment on a detection signal (angular velocity equivalent) when external vibration was applied to a tuning fork type vibration gyro (an example of the present invention)
Figure 22:
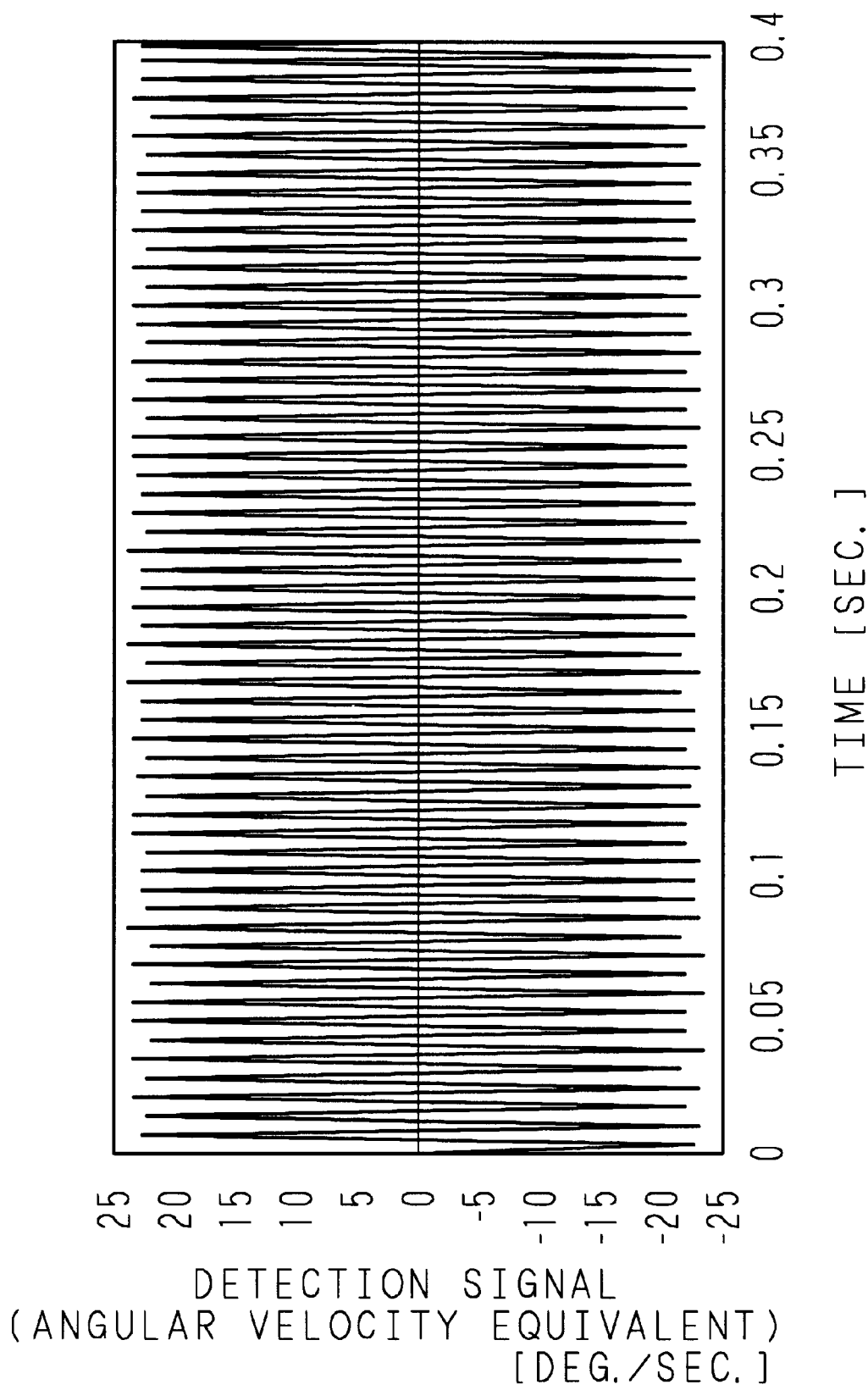
FIG. 22 is a view showing the result of an experiment on a detection signal (angular velocity equivalent) when external vibration was applied to a tuning fork type vibration gyro (a prior art).

FIGS. 21 and 22 are views showing detection signals (angular velocity equivalent) obtained by experimentally applying external vibration to a tuning fork type vibration gyro of an example of the present invention which satisfies the above two conditions and to a tuning fork type vibration gyro of a comparative example which does not satisfy the above two conditions. FIGS. 21 and 22 show the results of experiments on the example of the present invention and the comparative example, respectively. Further, in either of the examples, vibration was applied in the Y direction at 140 Hz and 1 G, and fs=1 kHz, t=1 sec. and Δf=120 Hz. In the example of the present invention, the amplitude of the unnecessary signal was ⅕ of that in the comparative example, and thus it was confirmed that the technique of the present invention is effective for decreasing the unnecessary signal that is produced when external vibration is applied.

INDUSTRICAL APPLICABILITY

As described above, in a tuning fork type vibration gyro of the present invention, an oscillation limiting member for limiting the oscillation range of a tuning fork type vibrator is provided. Therefore, when great external vibration or impact is applied, although the tuning fork type vibration gyro has a more compact structure compared with a prior art, the arms can never bump against the surrounding members, and it is possible to avoid a loss of the gyro function due to a stop of in-plane vibration, broken arms, etc.

Moreover, in the tuning fork type vibration gyro of the present invention, since the absolute value of the difference between the resonant frequency of drive vibration and the resonant frequency of detection vibration is made greater than the upper limit of a required frequency characteristic or the reciprocal number of the integral time, it is possible to significantly decrease an unnecessary signal caused by external vibration and improve the vibration resistance characteristic.

What is claimed is:

1. A tuning fork type vibration gyro comprising a tuning fork type vibrator including two arms and a base, and a supporting substrate for supporting said base, said tuning fork type vibration gyro including an oscillation limiting member disposed at a position in a direction to said base from a joint section of said arms, for limiting an amplitude of oscillation of said tuning fork type vibrator.

2. The tuning fork type vibration gyro as set forth in claim 1, further comprising an adhesive layer between said tuning fork type vibrator and said supporting substrate, for bonding said tuning fork type vibrator and said supporting substrate together, wherein said oscillation limiting member is secured to either said tuning fork type vibrator, said supporting substrate or said adhesive layer.

3. The tuning fork type vibration gyro as set forth in claim 1, further comprising a case for housing said tuning fork type vibrator and supporting substrate, wherein said oscillation limiting member is disposed between said tuning fork type vibrator and said case.

4. The tuning fork type vibration gyro as set forth in claim 1, further comprising a circuit substrate connected with said tuning fork type vibrator, wherein said oscillation limiting member is secured to said circuit substrate.

5. The tuning fork type vibration gyro as set forth in claim 3, wherein a clearance between said arm and said case or a clearance between said arm and said circuit substrate is not smaller than a predetermined value.

6. The tuning fork type vibration gyro as set forth in claim 4, wherein a clearance between said arm and said case or a clearance between said arm and said circuit substrate is not smaller than a predetermined value.

7. The tuning fork type vibration gyro as set forth in claim 5, wherein said tuning fork type vibration gyro simultaneously satisfies equations $H = L \times \sin\theta > 0$, and $\tan\theta = (H-H')/L'$ where H is a distance between said tuning fork type vibrator and said case or said circuit substrate, L is a distance between a center of oscillation of said tuning fork type vibrator and supporting substrate and a tip of said tuning fork type vibrator, H' is a distance between said case or said circuit substrate and a position at which said tuning fork type vibrator or said supporting substrate comes into contact with said oscillation limiting member when said tuning fork type vibrator oscillates, and L' is a distance between the center of oscillation of said tuning fork type vibrator and supporting substrate and the position at which said tuning fork type vibrator or said supporting substrate comes into contract with said oscillation limiting member when said tuning fork type vibrator oscillates.

8. The tuning fork type vibration gyro as set forth in claim 6, wherein said tuning fork type vibration gyro simultaneously satisfies equations $$H = L \times \sin\theta > 0, \text{ and}$$

$$\tan\theta = (H-H')/L'$$

where H is a distance between said tuning fork type vibrator and said case or said circuit substrate, L is a distance between a center of oscillation of said tuning fork type vibrator and supporting substrate and a tip of said tuning fork type vibrator, H' is a distance between said case or said circuit substrate and a position at which said tuning fork type vibrator or said supporting substrate comes into contact with said oscillation limiting member when said tuning fork type vibrator oscillates, and L' is a distance between the center of oscillation of said tuning fork type vibrator and supporting substrate and the position at which said tuning fork type vibrator or said supporting substrate comes into contract with said oscillation limiting member when said tuning fork type vibrator oscillates.

9. The tuning fork type vibration gyro as set forth in claim 1, wherein said oscillation limiting member is formed from a material selected from a group consisting of elastic bodies of epoxy resins, urethane resins, silicone rubbers and butyl rubbers, and foam materials thereof.

10. The tuning fork type vibration gyro as set forth in claim 9, wherein a hardness of said oscillation limiting member is not more than 100 (JIS A).

11. A tuning fork type vibration gyro comprising a tuning fork type vibrator including two arms and a base; a circuit for exiting a drive vibration; a detection circuit for detecting a detection vibration that occurs when a rotational angular velocity is applied; and a signal processing circuit for converting a detection signal of said detection circuit into a digital signal and processing the digital signal, wherein a sampling frequency of said signal processing circuit is greater than two times a reciprocal number of an integral time in the signal processing, said tuning fork type vibration gyro being characterized in that an absolute value of a difference between a resonant frequency of said drive vibration and a resonant frequency of said detection vibration is greater than the reciprocal number of said integral time.

* * * * *

UNITED STATES PATENT AND TRADEMARK OFFICE
CERTIFICATE OF CORRECTION

PATENT NO. : 6,366,005 B2
DATED : April 2, 2002
INVENTOR(S) : Ishikawa et al.

It is certified that error appears in the above-identified patent and that said Letters Patent is hereby corrected as shown below:

<u>Title page,</u>
Item [63], delete "Jun. 26, 1998" and insert -- Jun 5, 1999 -- therefor <u>Column 14,</u>
Line 3, delete "contract" and insert -- contact -- therefor Signed and Sealed this Sixth Day of May, 2003

JAMES E. ROGAN
*Director of the United States Patent and Trademark Office*